United States Patent

Huus et al.

(10) Patent No.: US 9,768,972 B2
(45) Date of Patent: Sep. 19, 2017

(54) METHOD FOR COMMUNICATION WITHIN A CO-OPERATIVE SYSTEM

(71) Applicant: Kapsch TrafficCom AB, Jönköping (SE)

(72) Inventors: Fredrik Huus, Huskvarna (SE); Johan Rogö, Habo (SE); Håkan Wennerholm, Aneby (SE)

(73) Assignee: Kapsch TrafficCom AB, Jönköping (SE)

( * ) Notice: Subject to any disclaimer, the term of this patent is extended or adjusted under 35 U.S.C. 154(b) by 255 days.

(21) Appl. No.: 14/204,861

(22) Filed: Mar. 11, 2014

(65) Prior Publication Data

US 2014/0254480 A1 Sep. 11, 2014

(30) Foreign Application Priority Data

Mar. 11, 2013 (EP) ..................................... 13158657

(51) Int. Cl.
*H04L 12/18* (2006.01)
*H04L 29/08* (2006.01)
*G04R 20/02* (2013.01)

(52) U.S. Cl.
CPC ............ *H04L 12/189* (2013.01); *H04L 67/12* (2013.01); *H04L 67/325* (2013.01); *G04R 20/02* (2013.01); *H04L 67/18* (2013.01)

(58) Field of Classification Search
USPC ....... 370/328, 329, 312, 316, 324, 350, 503, 370/520; 455/3.02, 12.1, 13.2, 427, 456.1
See application file for complete search history.

(56) References Cited

U.S. PATENT DOCUMENTS

| 5,319,374 A | 6/1994 | Desai et al. |
| 2006/0063536 A1* | 3/2006 | Kim ....................... G01S 5/0036 455/456.1 |

(Continued)

FOREIGN PATENT DOCUMENTS

| FR | 2746533 A1 | 9/1997 |
| FR | 2785112 A1 | 4/2000 |

OTHER PUBLICATIONS

Extended European Search Report received in application No. 13158657.0 dated Aug. 9, 2013, 7 pages.

*Primary Examiner* — Edan Orgad
*Assistant Examiner* — Saumit Shah
(74) *Attorney, Agent, or Firm* — Fiala & Weaver P.L.L.C.

(57) ABSTRACT

A method for communication within a co-operative system is provided. The co-operative system comprises a plurality of communication units, which are adapted to execute a group of tasks repeatedly in a repetition cycle: acquire raw data from at least one raw data collector, process the raw data into an information package, and broadcast of the information package. The repetition cycle lasts a predetermined time period from a start of a repetition cycle, and the at least one raw data collector collects data from a global navigation satellite system (GNSS). The raw data from the GNSS comprises a global timing signal, to which said communication units synchronize. A timing of said execution of tasks is dependent of said global timing signal. An individual acquisition time for acquiring raw data from the raw data collectors is set for each of the plurality of communication units.

9 Claims, 4 Drawing Sheets

(56) References Cited

U.S. PATENT DOCUMENTS

| | | | |
|---|---|---|---|
| 2006/0176896 A1* | 8/2006 | Callaway, Jr. | H04L 1/1867 370/437 |
| 2010/0267344 A1* | 10/2010 | Guner | H04W 52/322 455/67.11 |
| 2011/0291882 A1* | 12/2011 | Walsh | G01S 19/46 342/357.29 |

* cited by examiner

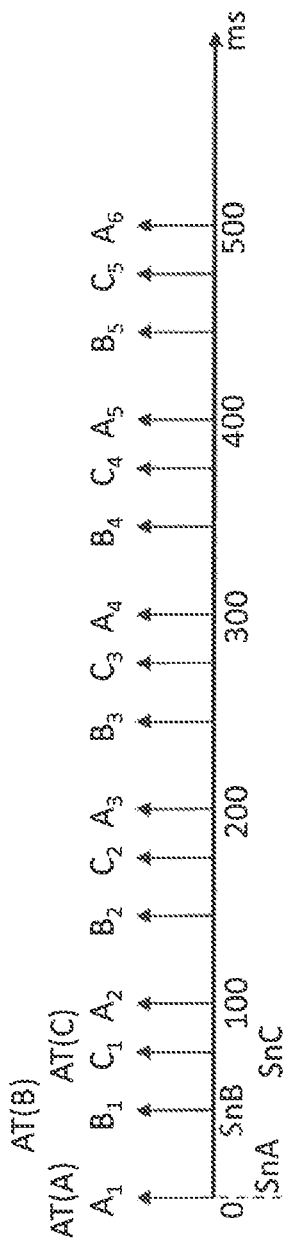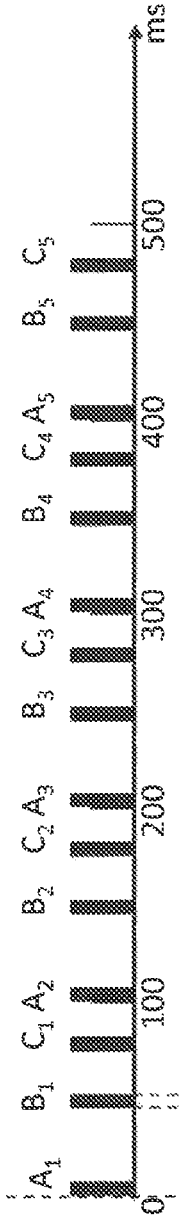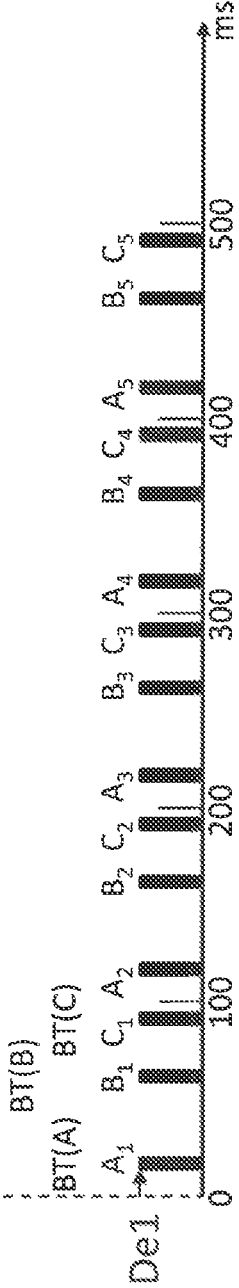

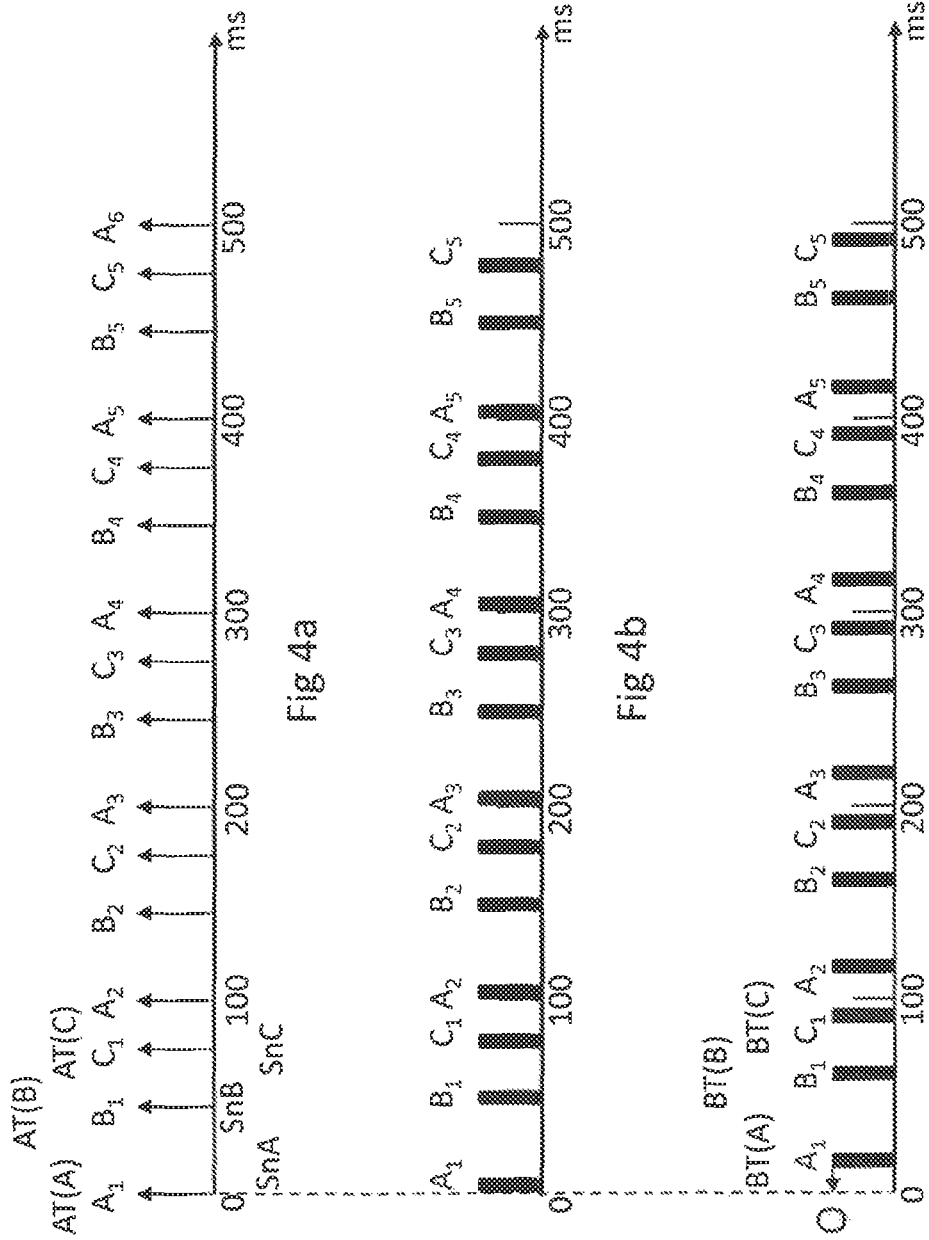

METHOD FOR COMMUNICATION WITHIN A CO-OPERATIVE SYSTEM

CROSS-REFERENCE TO RELATED APPLICATION(S)

This application claims priority to European Patent Application No. EP 13158657.0, filed on Mar. 11, 2013, the entirety of which is incorporated by reference herein.

BACKGROUND

Technical Field

The present subject matter relates to the field of co-operative systems and especially a method to communicate within a co-operative system.

Background Art

A co-operative system comprises a plurality of communication units, which communicates in that they broadcast on a given wireless communication channel designated for the co-operative system. The communication units thereby broadcast information and receive information. The communication units can be integrated in vehicles and/or infrastructure in order to let the devices communicate with each other.

Co-operative systems are used as traffic information systems to facilitate vehicle-vehicle and vehicle-infrastructure communication.

One of the challenges in a co-operative system is that of the distribution information, i.e., the vehicle data that shall be broadcasted from every vehicle within a set interval.

For example, the vehicles transmit their data once every 100 milliseconds (ms). The data is typically a time-stamped position, speed and heading of the vehicle, but can further comprise information from vehicle sensing means such as speed sensing means, acceleration sensing means, road conditions sensing means, weather condition sensing means, driver intention sensing means, etc.

Normally the raw data is collected by a raw data collector, such as a global navigation satellite system (GNSS), or any other sensing means within a vehicle, such as speed sensing means, acceleration sensing means, road conditions sensing means, whether condition sensing means, driver intention sensing means, etc.

The raw data is computed into an information package that can be broadcasted within the co-operative system. E.g., a GNSS receiver continuously receives a position signal from the GNSS, wherein this information is acquired by the communication unit, at the same time for each of the devices in the co-operative system. The information is fed into a position solution engine, which typically is a Kalman filter. The position solution is computed into the information package within fractions of a full second. The information package can include further information collected by other raw data collectors, whereby the information package thereby includes also this information.

The time that it takes to compute the information package is not possible to predict precisely since it is dependent on many factors, such as amount of data and current speed of the device. Hence, there is a small range of time when the output from the position engine is given. When the output is ready, the data is included in a certain information package dedicated for broadcast in a co-operative system. This message is referred to as "Basic Safety Message" in the US and "Co-operative Awareness Message" in Europe, but will in the further text be referred to as information package.

As soon as the information package is ready, the radio module tries to access the wireless communication channel of the co-operative system and broadcast the information package. Because all devices acquire their data at a start of an interval and perform similar computations, there is an obvious risk that several devices try to access the channel to broadcast their respective information packages at the same time, which will result in that some transmitters have to back off and try again later. The back-off and retry scheme is controlled by algorithms in the 802.11 standard and is outside the scope of the present subject matter.

In order to improve the accessibility to the communication channel, several different methods have been proposed to distribute the time on where the transmitters try to access the wireless communication channel. One of those is called "Self Organized Time Division Multiple Access" where the devices are organized to transmit in a certain time slot, which is defined in an overall master frame. The master frame is distributed among the users without the interaction of a central station.

When using "Self Organize Time Division Multiple Access" for example within a system with three devices, the devices are getting their information packages transmitted at a pre-defined time, but there is always a delay in time introduced between the finish of the computation, i.e., when the information package is ready to be sent, and the broadcast of the information package. When the information package is actually broadcasted, the information package data in the information package has aged during the delay.

By communicating aged data in the co-operative system, errors can occur and the relevance of the information in the system is decreased.

BRIEF SUMMARY

It is desired to always broadcast as fresh data as possible in the information packages, an object is thereby to suggest a method for communication within a co-operative system, such that the information communicated within the system is as updated as possible during broadcast of the same.

A co-operative system comprises a plurality of communication units, which communicate in that they broadcast on a given frequency. The method is adapted for a co-operative system in which a plurality of communication units are adapted to execute a group of tasks repeatedly, wherein at least one of the tasks is to broadcast at the frequency of the co-operative system. The tasks are repeated in repetition cycles. The communication units in the co-operative system for which the method is adapted perform the following tasks:

The communication unit acquires raw data from at least one raw data collector. The communication unit processes the acquired raw data into an information package. The communication unit broadcasts the information package at the frequency intended for the co-operative system.

A raw data collector is at least a unit able to receive signals from a global navigation satellite system (GNSS), such that a position of the raw data collector, e.g., the vehicle, can be determined. The information from the GNSS also comprises a time stamp, i.e., global timing information to which the communication units synchronise. A raw data collector can further be any other sensing means within the vehicle, such as speed sensing means, acceleration sensing means, road conditions sensing means, whether condition sensing means, driver intention sensing means, etc.

The repetition cycle lasts a predetermined time period from a start of a repetition cycle. For example, the communication units can be set to perform the task at least once every 100 millisecond (ms). The at least one raw data collector collects data at least from the GNSS. Because the different communication units within the co-operative system are synchronised to the global timing signal derived from the GNSS's global timing information, the cycle at which the communication units are to perform their tasks is synchronised.

The method assures a spread of the broadcasting in that each of the plurality of communication units is given an individual acquisition time for acquiring raw data from the raw data collectors. Because the communication units acquire their raw data at different times it is more likely that the channel is free when the communication unit has performed the computation of the information package and attempts to access the communication channel in order to broadcast.

The method achieves a spread between when the different communication units acquire their raw data, whereby the following steps; processing the raw data into an information package and the thereafter broadcasting of the information package can follow immediately after the acquisition of raw data. The risk that several communication units try to broadcast simultaneously is reduced. With the inventive method the age of the broadcasted information is as low as possible, because there is no or a minimal waiting time between the acquisition, processing and the broadcasting. By implementing the method it is enabled that the communication units always broadcast as fresh information as possible, and further the risk for a broadcasting collision between a plurality of communication units within each other's broadcasting range is reduced considerably.

To minimise the waiting time, the processing of the raw data into an information package and the broadcast of the information package may be executed directly after the preceding task.

In an embodiment of the method additionally to an individual acquisition time a delay time for broadcasting the information package is set for each of the plurality of communication units. The delay time is set as a delay from the start of a repetition cycle. The processing of raw data into an information package is however executed directly after the acquisition of raw data. The broadcast of said information package is thereby executed at a delay from the start of a repetition, wherein the lapsed time between the processing of raw data into an information package and the broadcast can vary depending of the time needed for the processing of raw data. An advantage with this embodiment is that each communication unit also becomes an individual broadcasting time, wherein the risk for collision in broadcasting can further reduced.

In order to enable broadcasting information with as low age as possible when both an individual acquisition time and an individual broadcasting time (set as a delay from the start) is set, the individual acquisition time may be calculated as an offset from said individual broadcasting time. The offset is calculated such that that the individual acquisition time occurs before said broadcast and at earliest at the start of a repetition. By making the individual acquisition time dependent on the individual broadcasting time, the time between the acquisition and the broadcast can be held down, wherein the age of the broadcasted information is as low as possible.

The calculation of the offset may be dependent of both the processing speed of the communication unit and the delay for the broadcasting time. By implementing the offset of the individual acquisition time as dependent of the processing time for the communication unit and the delay of the broadcasting time the task can be performed essentially immediately after one another even though an individual broadcasting time is set for each communication unit.

In an alternative embodiment the individual acquisition time is randomly set as a delay from a start of a repetition. The delay for the individual acquisition time can be set at each start-up of a communication unit. A random delay algorithm may be used therefore. An advantage with setting the delay for the acquisition at start-up of each communication unit is that the calculation must just be performed once for each start.

In an alternative approach of setting the individual acquisition time, it is set as a delay from the start of a repetition cycle, wherein the individual acquisition time of a first communication unit is set dynamically dependent upon individual acquisition times of other communication units, within which broadcasting ranges the first communication unit is located. By setting the individual acquisition time dynamically and dependent on the individual acquisition times of the communication units that are within each other's broadcasting range, a controlled spread of the broadcasting can be achieved. Collisions between pluralities of broadcasts from different communication units can be avoided, because the broadcasts are indirectly delayed dependently of each other.

Yet another alternative approach of setting the individual acquisition time is that it is set randomly as a delay or predetermined spread delay from each start of a repetition at production of said communication units. By setting a delay for the individual acquisition time already at production of said communication units, an even spread of the individual acquisition time can be assured within a batch of communication units.

Communications units usually use a pseudo-id when communicating in a co-operative system. The pseudo-id is changed in regular or irregular intervals. In an alternative embodiment, the individual acquisition time is set in intervals corresponding to the interval of changes of a communication unit's pseudo-id. By changing the individual acquisition time together with the change of pseudo-id, a tracking of an individual communication unit becomes harder, wherein the integrity of the user of the communication unit is increased.

Embodiments facilitate that as fresh data as possible is broadcasted within the co-operative network. However, even when an embodiment is implemented, it can occur that the channel is busy when a communication unit tries to broadcast its information package. If a broadcast is unsuccessful, the communication unit backs-off and retries at a later stage. The back-off and retry scheme is controlled by algorithms in the 802.11 standard and is outside the scope of the present subject matter.

BRIEF DESCRIPTION OF THE DRAWINGS/FIGURES

FIG. 1 schematically shows a co-operative system according to an embodiment.

FIGS. 2a-2c schematically shows the time distribution of tasks performed within the co-operative system according to an embodiment.

FIGS. 3a to 3c show a different embodiment.

FIGS. 4a to 4c show a further different embodiment.

DETAILED DESCRIPTION

Figure 1:
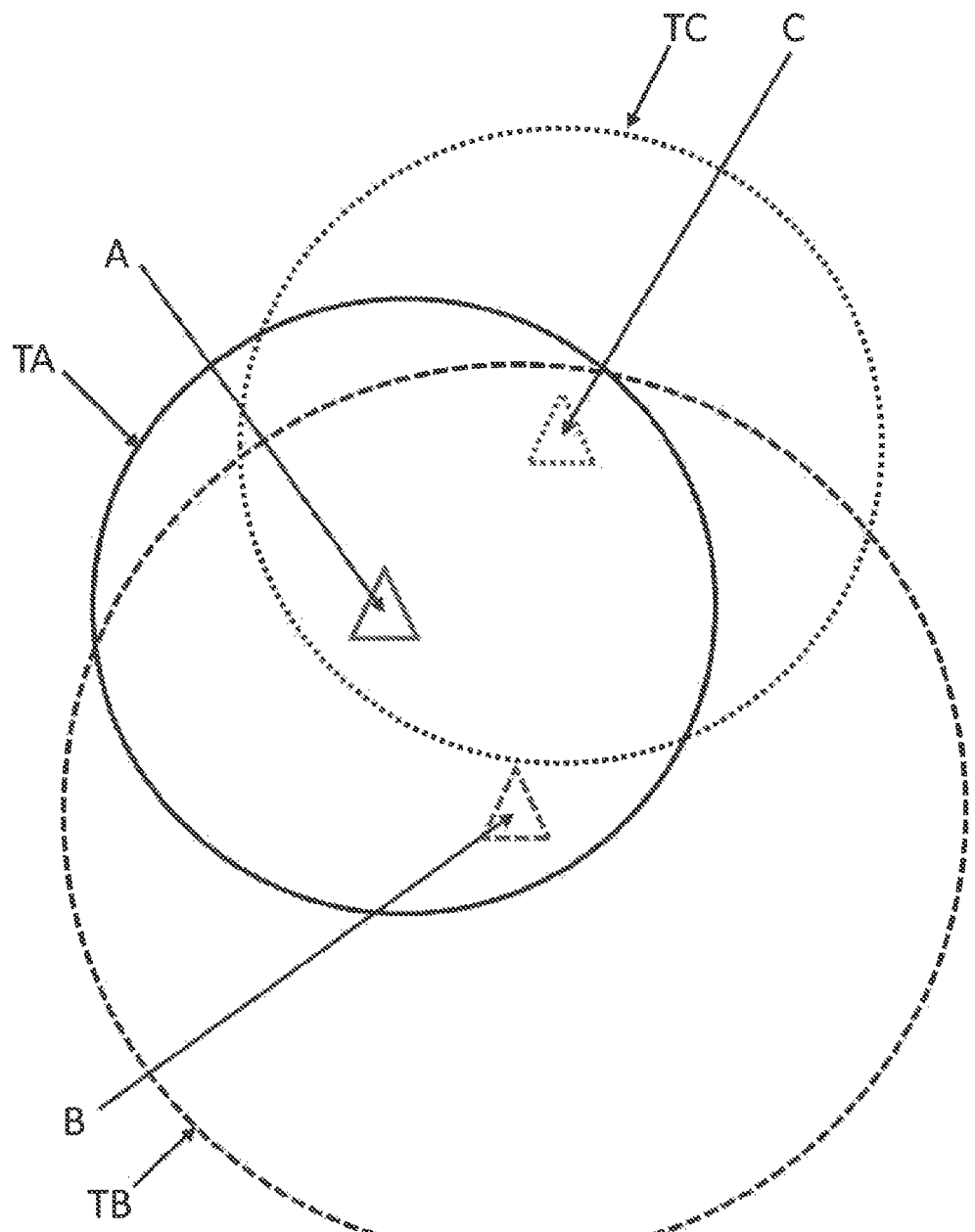

FIG. 1 schematically shows a co-operative system CS according to an embodiment. The co-operative system comprises a plurality of communication units A, B, C. The communication units A, B, C can be of any type suitable to be active in the co-operative system CS, and be arranged in a vehicle or a road side unit. In the example all the communication units will be referred to as arranged in vehicles.

The vehicles in which communication units A, B, C in FIG. 1 are located can all be travelling in the same direction, in different directions and/or on the same or on different roads. The communication units A, B, C broadcast on the frequency/channel designated for the co-operative system CS. The communication units A, B, C are all equipped with or have access to a raw data collector RC capable of receiving/sensing and processing the raw data D into an information package P. The communication units A, B, C are equipped with a radio communication unit arranged to communicate in the designated frequency/channel.

In FIG. 1 the broadcast ranges TA, TB, TC of communication units A, B, C in the co-operative system are shown. Communication unit A has a broadcast range of TA, communication unit B has a broadcast range of TB and communication unit C has a broadcast range of TC. The communication units A, B, C in FIG. 1 have different broadcast ranges TA, TB, TC. A broadcast by the communication unit A can be received by both the communication units B and C. A broadcast of communication unit B can be received by communication unit A and C. A broadcast of communication unit C can be received by communication unit A. Due to the different broadcast ranges TA, TB, TC of the communication units A, B, C and the different distances between the communication units A, B, C not all communication units A, B, C are able to communicate with each other. However, the communication units A, B, C are adapted to be arranged in vehicles, whereby the FIG. 1 only is an instantaneous situation of a dynamic reality.

Figure 2A:
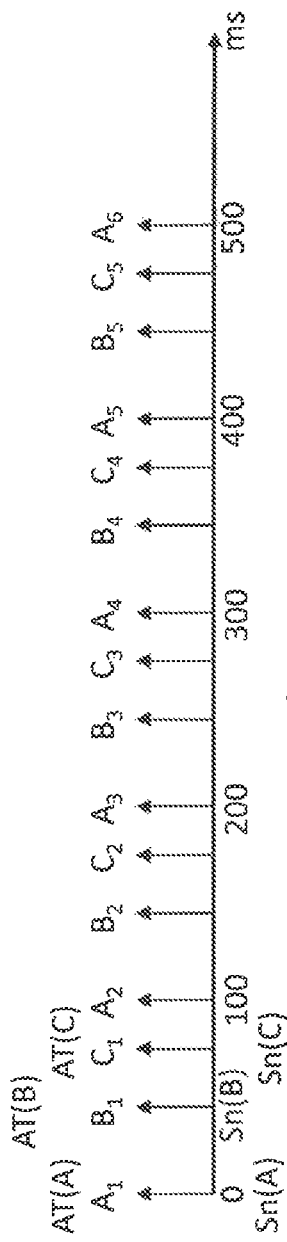
Figure 2B:
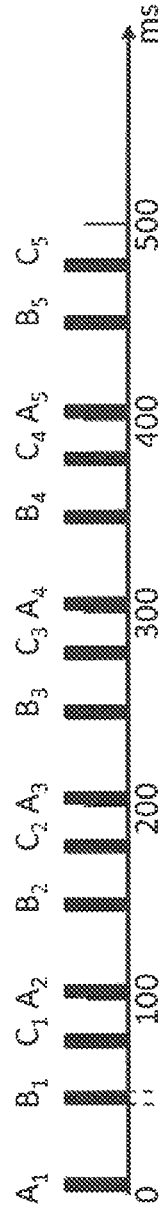
Figure 2C:
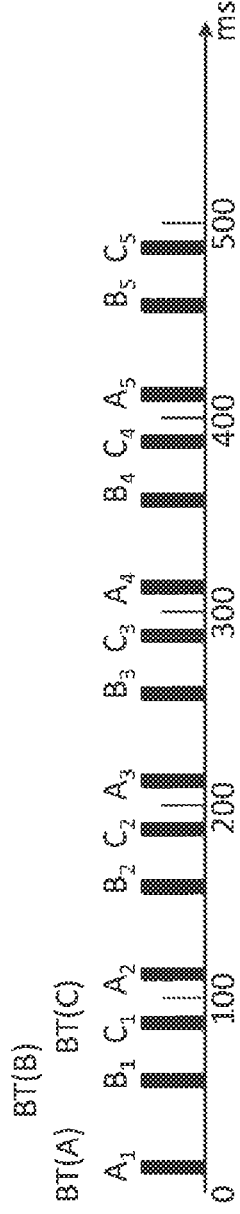

Now, FIGS. 2a-2c schematically shows the time distribution of tasks performed within the co-operative system according to an embodiment. $A_1$, $A_2$ etc. illustrates various times for communication unit A to perform the tasks described in conjunction to each of the FIGS. 2a-2c. The same applies to communication units B and C.

FIG. 2a schematically shows the time distributed acquiring of raw data for communication units A, B and C. FIG. 2b schematically shows the time distribution of the processing of the acquired raw data into an information package for communication units A, B and C. FIG. 2c shows the time distribution for the broadcast attempts of the information packages for communication units A, B and C. FIGS. 2a-2c together shows a number of repetition cycles for performing the tasks of embodiments for communication units A, B, C within each repetition cycle.

In FIG. 2a the acquisition of raw data from communication unit A is performed at even intervals starting at SnA=0 ms. The predetermined time period from start of the repetition cycle is of 100 ms. The acquisition of raw data from communication unit B is performed at even intervals starting at SnB The acquisition of raw data from communication unit C is performed at even intervals starting at SnC. The predetermined time period of each interval is in the example 100 ms but may be different depending of the setup of the method and/or the setup of the communication units A, B, C. The start of the interval for communication unit A, SnA, may be at a time different from 0 ms.

The intervals are synchronized by a global timing signal located in the raw data from the GNSS. As can be seen from FIG. 2a an individual acquisition time for acquiring raw data D from the raw data collectors of the communication units is set for each of the plurality of communication units A, B, C. In FIG. 2a the individual acquisition times ATA, ATB, ATC for communication units A, B, C are shown. The individual acquisition times ATA, ATB, ATC may be randomly set as a delay from a start of a repetition, wherein said individual acquisition times ATA, ATB, ATC are set at each start-up of a communication unit A, B, C. Alternatively the individual acquisition times ATA, ATB, ATC may be set as a delay from a start of a repetition.

The individual acquisition times of a first communication unit can be set dynamically dependent upon individual acquisition times of other communication units within a range allowing said other communication units to broadcast to said first communication unit. This is described best with reference to the instantaneous captured situation in FIG. 1. In the situation disclosed in FIG. 1, communication unit A can receive the broadcasts from communication units B and C, whereby the individual acquisition time ATA of communication unit A is set dependent of the individual acquisition times ATB, ATC of communication units B and C. Correspondently, the acquisition time ATC of communication unit C is set dependent of the individual acquisition times ATA, ATB of communication units A and B. However, communication unit B is only within the broadcasting range TA of communication unit A, wherein the individual acquisition time ATB of communication unit B is set only dependent of the individual acquisition time ATA of communication unit A.

Further, the individual acquisition times ATA, ATB, ATC can be randomly set as a delay from each start of a repetition at production of said communication unit A, B, C.

FIG. 2b schematically shows the distribution time for processing of the raw data into information packages P. The width of the staples in FIG. 2b indicates the calculation time Ct needed to process the raw data. FIG. 2c schematically shows the individual broadcasting times BTA, BTB, BTC for communication units A, B, C. The width of the staples in FIG. 2c indicates the distribution in time, at which the communication units try to broadcast their information packages.

In FIGS. 2b and 2c the task of processing raw data into an information package, and broadcasting said information package, are executed directly after the preceding task. There are thus no delays between the task of acquiring raw data $A_1$ in FIG. 2a and the processing task $A_1$ in FIG. 2b or between the processing task $A_1$ in FIG. 2b and the broadcasting task $A_1$ in FIG. 2c. The same principle applies to all tasks in FIGS. 2a-2c.

FIGS. 3a to 3c show a different embodiment. In FIG. 3b the processing of said raw data into an information package is executed directly after the acquiring of raw data. In FIG. 3c the said broadcast of said information package is executed at an individual broadcasting time BTA at a delay De1 from said start SnA of a repetition cycle. In FIG. 3 only one individual broadcasting time is shown. The same principle applies to all broadcasting times in FIG. 3c. The delay De1 may be a universal delay for all communication units A, B, C. It is also possible for the communication units A, B, C to each have individual delays for the broadcasting times BTA, BTB, BTC. The individual acquisition times ATA, ATB, ATC may further be dependent on a calculation time Ct of said information package, which in FIG. 3b is indicated by the width of the staples.

FIGS. 4a to 4c show a different embodiment. In FIG. 4c a broadcast of said information package is executed at an individual broadcasting time BTA from said start SnA of a repetition cycle. In FIG. 4a the individual acquisition time ATA is calculated as an offset O dependent of said individual broadcasting time BTA, such that said acquisition of raw data occurs before said broadcasting and at earliest at said start of a repetition. The processing of said raw data into an information package may be executed directly after the acquiring of raw data or be done with a delay. The same principle applies to all acquisition times in FIG. 4a. The offset O may be a universal offset for all communication units A, B, C. It is also possible for the communication units A, B, C to each have individual offsets for the acquisition times ATA, ATB, ATC.

The delay times for the delays described above are set with a random delay algorithm.

In FIGS. 2a-4c what is described for one time period applies to all time periods of the same embodiment. It is also possible to switch between the embodiments shown in FIGS. 2a-2c, 3a-3c and 4a-4c.

CONCLUSION

Reference signs mentioned in the claims should not be seen as limiting the extent of the matter protected by the claims, and their sole function is to make claims easier to understand.

As will be realized, the invention is capable of modification in various obvious respects, all without departing from the scope of the appended claims. Accordingly, the drawings and the description are to be regarded as illustrative in nature, and not restrictive.

What is claimed is:

1. A method for communication within a co-operative system that comprises a plurality of communication units, wherein the communication units are adapted to execute a group of tasks repeatedly in a repetition cycle, the tasks including:
   acquiring raw data from at least one raw data collector,
   processing said raw data into an information package, and
   broadcasting of said information package responsive to completion of said processing said raw data into an information package,
   wherein said repetition cycle lasts a predetermined time period from a start of a repetition cycle, and said at least one raw data collector collects data from a global navigation satellite system (GNSS),
   wherein said raw data from the GNSS comprises a global timing signal to which said communication units synchronise, and
   wherein a timing of said execution of tasks is dependent of the global timing signal, characterised in that an individual acquisition time for acquiring raw data from the at least one raw data collector is set for each of the plurality of communication units.

2. The method according to claim 1, wherein said processing of said raw data into an information package is executed directly after said acquiring.

3. The method according to claim 1, wherein said processing of said raw data into an information package is executed directly after the acquiring of raw data, and said broadcast of said information package is executed at an individual broadcasting time at a delay from said start of a repetition cycle.

4. The method according to claim 3, wherein said individual acquisition time is calculated as an offset dependent of said individual broadcasting time, such that said acquisition of raw data occurs before said broadcasting and at earliest at said start of a repetition cycle.

5. The method according to claim 3, wherein said individual acquisition time is further dependent on a calculation time of said information package.

6. The method according to claim 1, wherein said individual acquisition time is randomly set as a delay from a start of a repetition cycle, wherein said individual acquisition time is set at each start-up of a communication unit.

7. The method according to claim 1, wherein said individual acquisition time is set as a delay from a start of a repetition cycle, wherein said individual acquisition time of a first communication unit is set dynamically dependent upon individual acquisition times of other communication units located within a broadcasting range of said first communication unit.

8. The method according to claim 1, wherein said individual acquisition time is randomly set as a delay from each start of a repetition cycle at production of a communication unit.

9. The method according to claim 1, wherein said individual acquisition time is randomly set as a delay from each start of a repetition cycle at each change of a pseudo-ID of a communication unit.

* * * * *